United States Patent
Cho et al.

(10) Patent No.: US 6,809,452 B2
(45) Date of Patent: Oct. 26, 2004

(54) SKELETON TYPE BRUSHLESS MOTOR

(75) Inventors: Kwan Yeul Cho, Seoul (KR); Hyoun Jeong Shin, Seoul (KR); Seung Do Han, Incheon (KR); Yoon Hyeo Kim, Siheung (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/041,613

(22) Filed: Jan. 10, 2002

(65) Prior Publication Data

US 2002/0175572 A1 Nov. 28, 2002

(30) Foreign Application Priority Data

May 26, 2001 (KR) ........................................ 2001-29268

(51) Int. Cl.[7] .............................................. H02K 1/00
(52) U.S. Cl. ...................... 310/216; 310/254; 310/49 R
(58) Field of Search ................................ 310/216, 254, 310/49 R, 90

(56) References Cited

U.S. PATENT DOCUMENTS

| | | | | |
|---|---|---|---|---|
| 3,935,489 A | * | 1/1976 | Church et al. ................ | 310/90 |
| 4,162,418 A | * | 7/1979 | Kawaki et al. ............. | 310/163 |
| 4,224,544 A | * | 9/1980 | McKinnon et al. ........... | 310/90 |
| 4,528,533 A | * | 7/1985 | Montagu .................. | 310/49 R |
| 4,777,394 A | * | 10/1988 | Hayashi ................. | 310/156.08 |
| 5,831,359 A | * | 11/1998 | Jeske ........................ | 310/68 B |
| 5,927,249 A | * | 7/1999 | Ackermann et al. ........ | 123/399 |
| 6,262,510 B1 | * | 7/2001 | Lungu ......................... | 310/166 |
| 6,271,638 B1 | * | 8/2001 | Erdman et al. ............. | 318/439 |

* cited by examiner

*Primary Examiner*—Dang Le
*Assistant Examiner*—Nguyen N Hanh
(74) *Attorney, Agent, or Firm*—Birch, Stewart, Kolasch & Birch, LLP

(57) ABSTRACT

A skeleton type brushless motor comprises: a rotor in which a rotational shaft is pressed and fixed; a stator including a first stator core and a second stator core in which rotor receiving parts for receiving the rotor are formed, a coil winding unit coupled to the stator cores, and a coil wound on the coil winding unit; and the first and second stator cores are separated and faces each other centering around the rotational shaft of the rotor, whereby a leakage flux is reduced and maneuverability and efficiency are increased.

23 Claims, 10 Drawing Sheets

SKELETON TYPE BRUSHLESS MOTOR

BACKGROUND OF THE INVENTION

1. Field of the Invention

The present invention relates to a skeleton type brushless motor, and particularly, to a skeleton type brushless motor by which a leakage flux is small, and a maneuverability and an efficiency are increased.

2. Description of the Background Art

FIG. 1 is a partially longitudinal sectional view showing a conventional skeleton type brushless motor, and FIGS. 2 and 3 are a side view and an enlarged view showing the conventional skeleton type brushless motor.

FIG. 4 is a side view showing a stator core in the conventional skeleton type brushless motor shown in FIG. 1, and FIGS. 5 and 6 are a side view and a plan view showing a PCB (Printed Circuit Board) cover in the conventional skeleton type brushless motor shown in FIG. 1.

As shown in FIGS. 1, 2, and 3, the conventional skeleton type brushless motor comprises: a rotor 111, a stator 121 in which the rotor 111 is received with an air gap therebetween, a PCB 151 in which a drive control circuit (not shown) for rotating and controlling the rotor 111 is formed; and a PCB cover 153 which is coupled to one side of the stator 121 for receiving and supporting the PCB 151.

The rotor 111 is made by a permanent magnet of cylindrical shape, and a rotational shaft 112 is fixed to a center of the rotor 111 so as to be rotatable as a single body with the rotor 111.

As shown in FIG. 4, the stator 121 comprises: a stator core 123 on which a first rotor receiving part 125a and a second rotor receiving part 125b are formed as a single body, a bobbin 127 which is assembled to the stator core 123, a coil 129 wound around the bobbin 127 and power is applied alternatively to each other.

The stator core 123 includes a first stator core 124a on which the first rotor receiving part 125a and the second rotor receiving part 125b which are disposed facing each other with the rotor 111 therebetween and generates magnetic poles alternatively with each other in accordance with a position of a magnetic pole on the rotor 111 are formed as a single body, and a second stator core 124b fixed to the first stator core 124a penetrating the bobbin 127 for forming a magnetic path.

The first stator core 124a and the second stator core 124b are made by laminating steel sheets and assembled as a single body with each other by rivet 131. In addition, a pair of through holes 133 are formed on the first stator core 124a as penetrating the plate surface thereof.

A pair of detent parts 135, which are symmetric with each other centering around the rotational shaft 112 of the rotor 111, are formed on the respective first rotor receiving part 125a and the second rotor receiving part 125b so that the rotor 111 is not arranged on a position of zero torque for initial driving the rotor 111.

The rotational shaft 112 of the rotor 111 is rotatably supported by a pair of bearings 137, and a bearing housing 139 is coupled around the bearings 137 so as to receive and support the bearings 137.

As shown in FIGS. 1 and 3, a bearing receiving part 141 is formed at center part of the bearing housing 139 so as to receive and support the bearing 137, and an extended receiving part 143 is formed on one side of the bearing receiving part 141 so as to cover exposed part of the rotor 111 which is exposed from the stator core 123 along with the rotational shaft direction.

A screw boss 145 which is received and coupled to the through hole 133 of the first stator core 124a is formed on boundary part of the extended receiving part 143 so that the screw 147 can be coupled via the shaft center.

Meanwhile, as shown in FIG. 5, a sensor receiving part 155 is formed on a center line of the rotor 111 in length direction of the FIG. 5 for receiving and supporting a position sensor (not shown) which detects a rotation position of the rotor 111 as having 90° of phase difference from a horizontal center line of the first and second rotor receiving parts 125a and 125b.

However, in the conventional skeleton type brushless motor, the first rotor receiving part 125a and the second rotor receiving part 125b are formed as a single body with each other, and therefore a leakage flux may be generated through a connected part, and accordingly, an effective magnetic flux is reduced. Therefore, the efficiency of the motor is lowered.

Also, in case that an outer diameter of the rotor 111 is increased in order to increase an output, then a width and a length of the stator 121 should be increased for corresponding to the increased outer diameter of the rotor, and therefore the motor can not be constructed compactly.

In addition, the extended receiving part 143 is formed integrally with the conductive bearing housing 139 for receiving the exposed part of the rotor 111 exposed from the stator core 123, and therefore, an eddy current loss may be generated by the extended receiving part 143.

Also, if the detent part 135 is enlarged so as to get advantage for initial driving, the air gap is enlarged relatively, and therefore the efficiency of the motor is lowered and it is not easy to improve initial maneuverability.

In addition, the position sensor is disposed on a position of 90° from the horizontal center line of the first and second rotor receiving part 125a and 125b and detects the rotation position, and therefore a delaying occurs until peak value of applied current is reached due to inductance components, if the magnetic pole of the rotor 111 and the electric current is applied another coil, whereby the efficiency of the motor is lowered.

Also, a DC (Direct Current) electric source should be used in the conventional skeleton type brushless motor, and therefore an additional DC power supplying device must be needed, which results in a large volume and high cost.

SUMMARY OF THE INVENTION

Therefore, an object of the present invention is to provide a skeleton type brushless motor which is able to reduce a leakage flux and improve maneuverability and efficiency.

To achieve the object of the present invention, as embodied and broadly described herein, there is provided a skeleton type brushless motor comprising: a rotor in which a rotational shaft is fitted and fixed; a stator including a first stator core and a second stator core in which a rotor receiving part for receiving the rotor is formed respectively, a coil winding unit coupled to the stator cores, and a coil wound on the coil winding unit; and wherein the first and the second stator cores are separated electrically with each other and faces each other centering around the rotational shaft of the rotor.

Also, the rotor receiving part comprises a first rotor receiving part and a second rotor receiving part of semicircular shape. In addition, a first separate space and a second separate space are formed between both ends of the first rotor receiving part and both ends of the second rotor receiving part.

Also, outer surfaces around both ends of the first rotor receiving part and of the second rotor receiving part in the first and second stator cores are protrudingly formed outwardly in a radial direction of the rotor.

Also, a rotation position sensor for sensing a rotational position of the rotor is disposed around 10°~20° in opposite direction of the rotational direction of the rotor from the separate space nearer to the coil winding unit.

Also, the skeleton type brushless motor according to the present invention comprises a driving control unit coupled to the coil winding unit in the rotational shaft direction for driving and controlling the rotor, and the driving control unit includes a sensor receiving part so that the rotational position sensor can be received therein.

Also, the skeleton type brushless motor further comprises a pair of shaft support parts for supporting the rotational shaft of the rotor so as to be rotatable, and a pair of separating members between the stators for separating the stator and the shaft support part. That separating members respectively includes a shielding member for shielding the separate spaces.

In addition, the skeleton type brushless motor comprises a driving control unit coupled on one side of the coil winding unit in the direction of the rotational shaft of the rotor for driving and controlling the motor, and the driving control unit is a PCB (Printed Circuit Board) on which a drive control circuit is formed. The PCB further comprises an AC capacitor connected to a utility power for decreasing the utility power, and a rectifier circuit for rectifying the power depressed by the AC capacitor.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
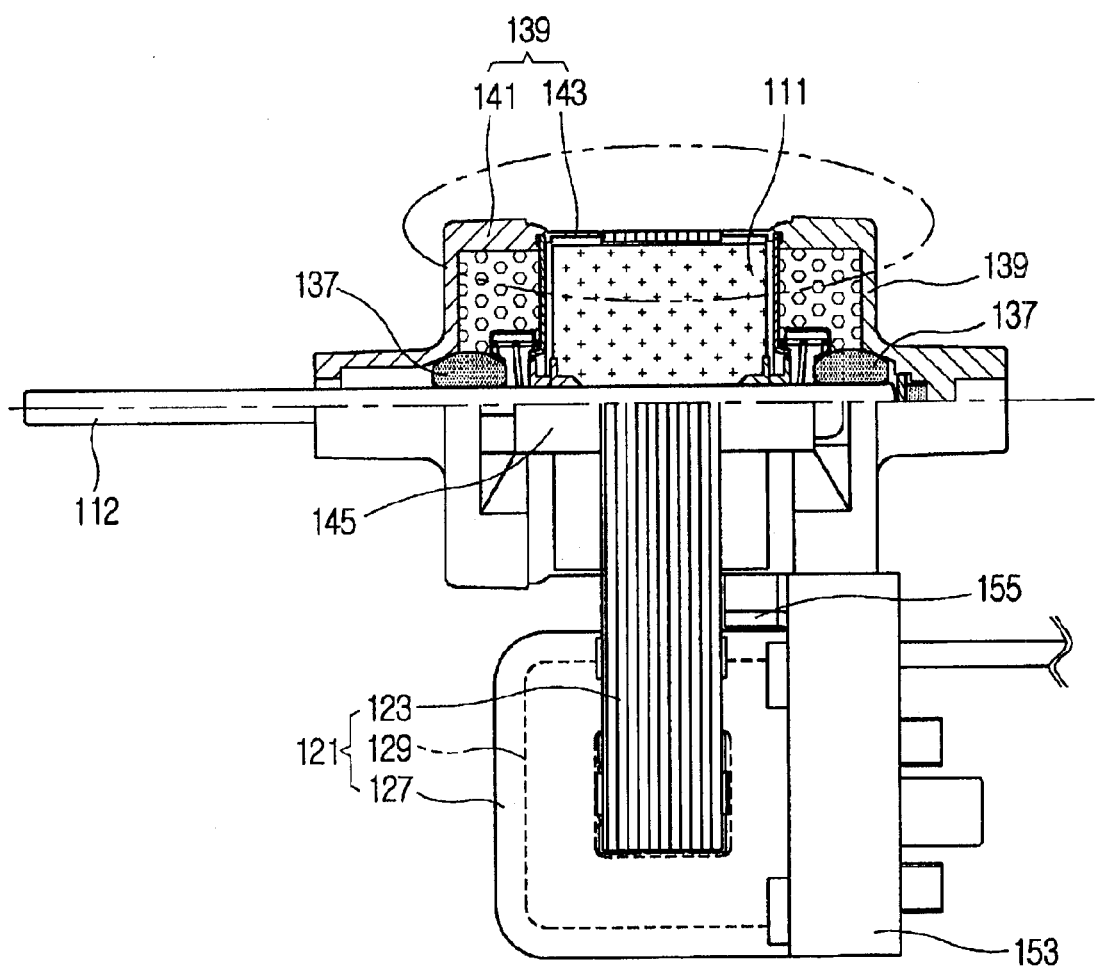
FIG. 1 is a partially longitudinal sectional view showing a conventional skeleton type brushless motor.
Figure 2:
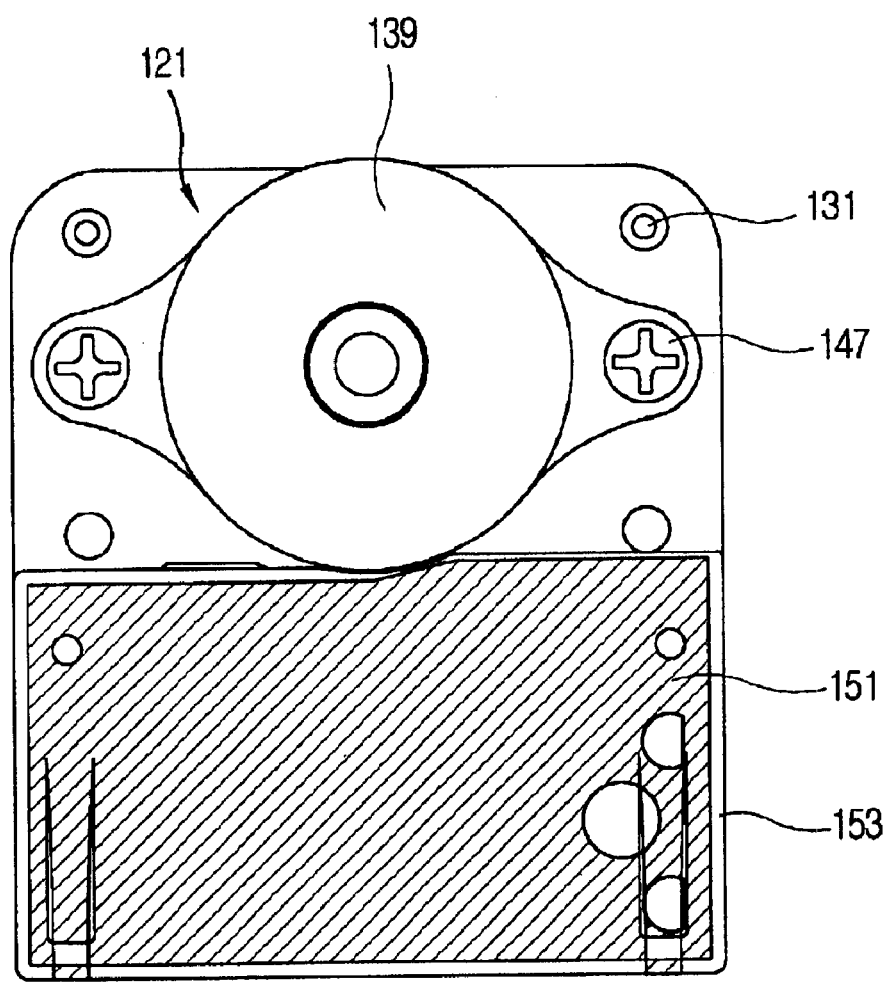
FIG. 2 is a side view showing the conventional skeleton type brushless motor.
Figure 3:
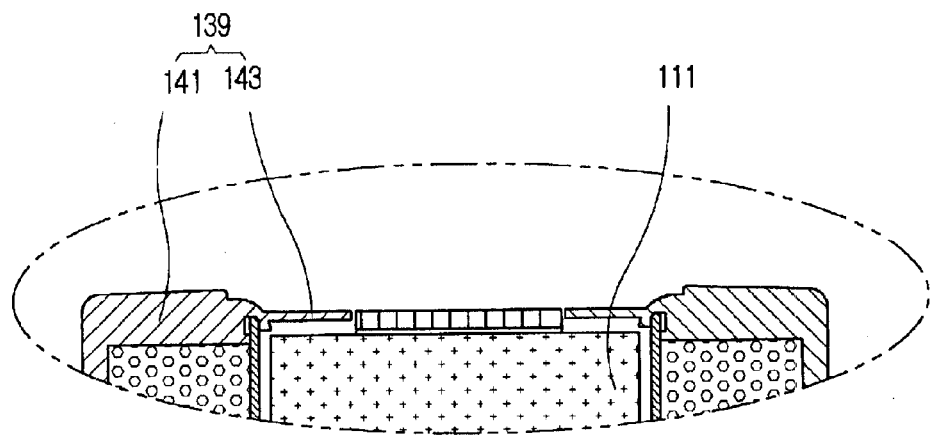
FIG. 3 is an enlarged view showing principal parts of the conventional skeleton type brushless motor.
Figure 4:
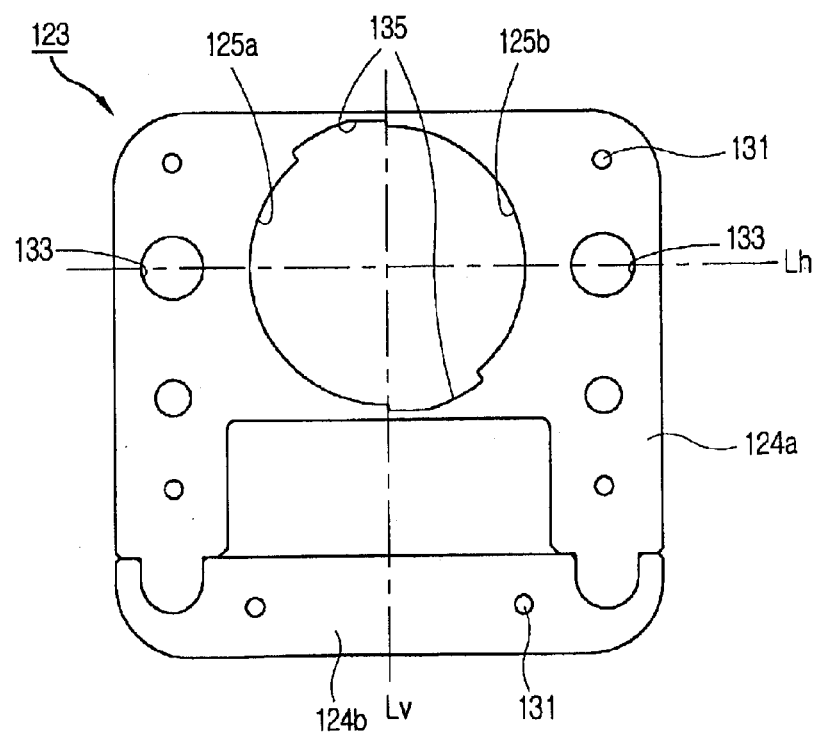
FIG. 4 is a side view showing a stator core in the conventional skeleton type brushless motor.
Figure 5:
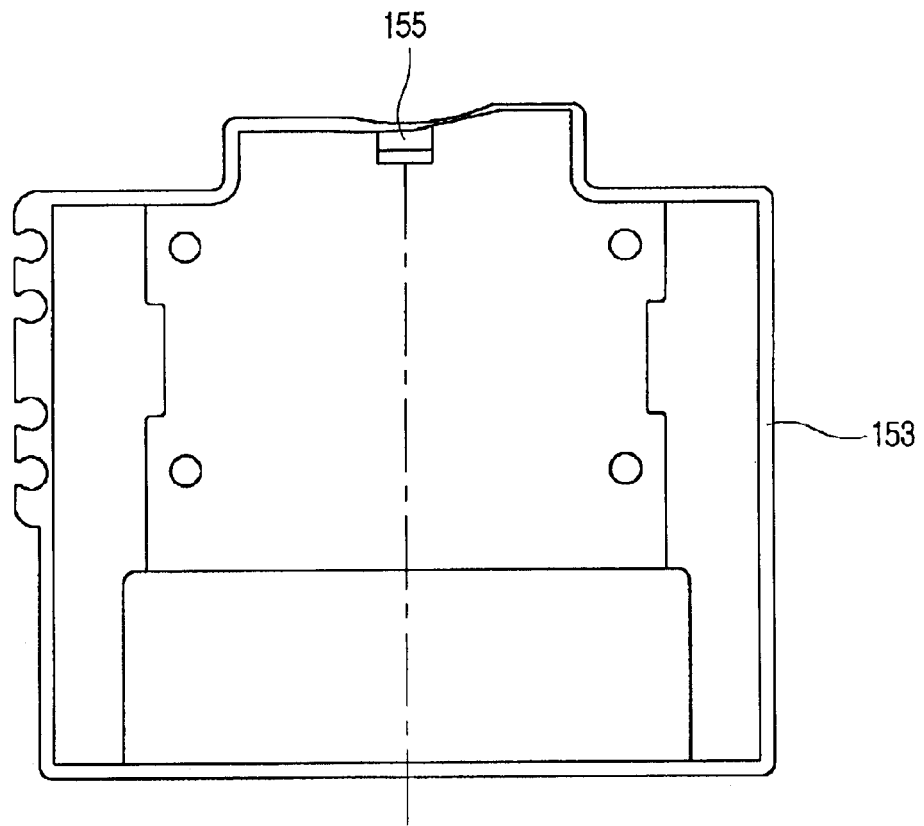
FIGS. 5 and 6 are a side view and a plan view showing a PCB cover in the conventional skeleton type brushless motor.
Figure 6:
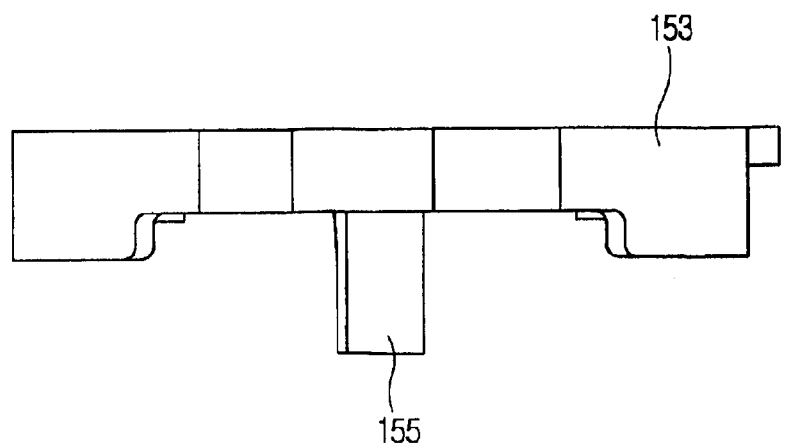
Figure 7:
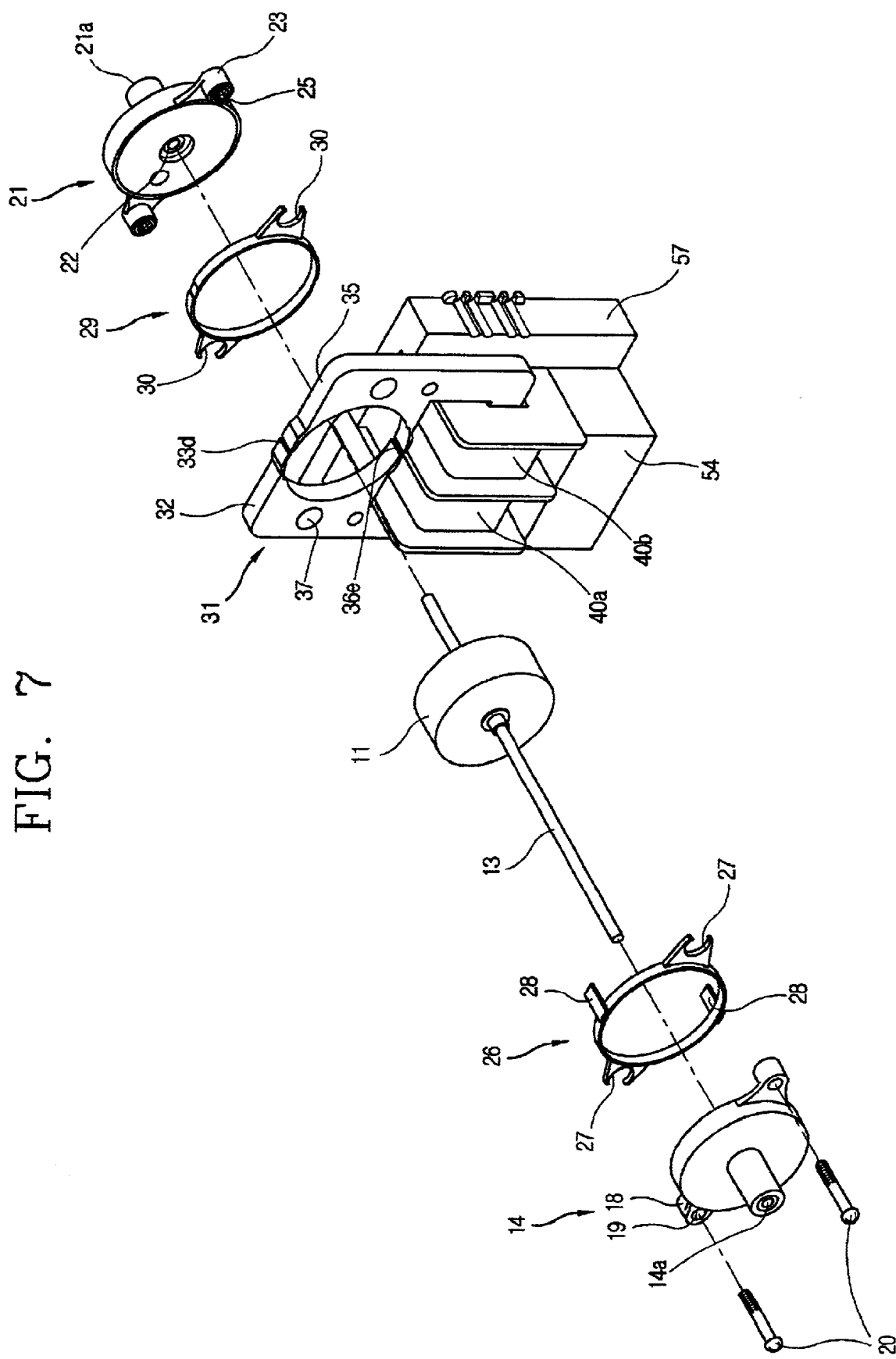
FIG. 7 is an exploded perspective view showing a skeleton type brushless motor according to the present invention.
Figure 8:
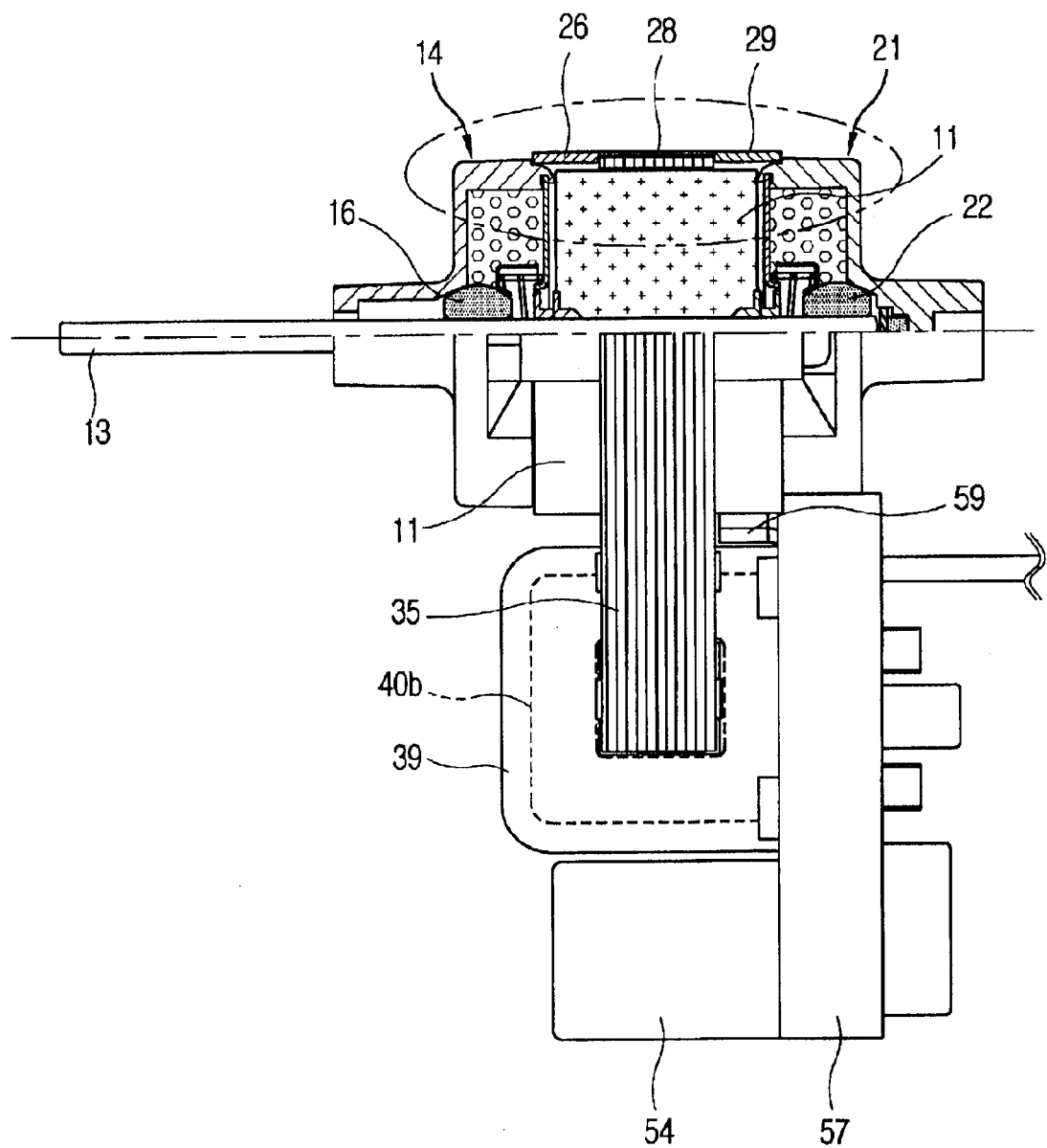
FIG. 8 is a partially longitudinal sectional view showing the skeleton type brushless motor according to the present invention.
Figure 9:
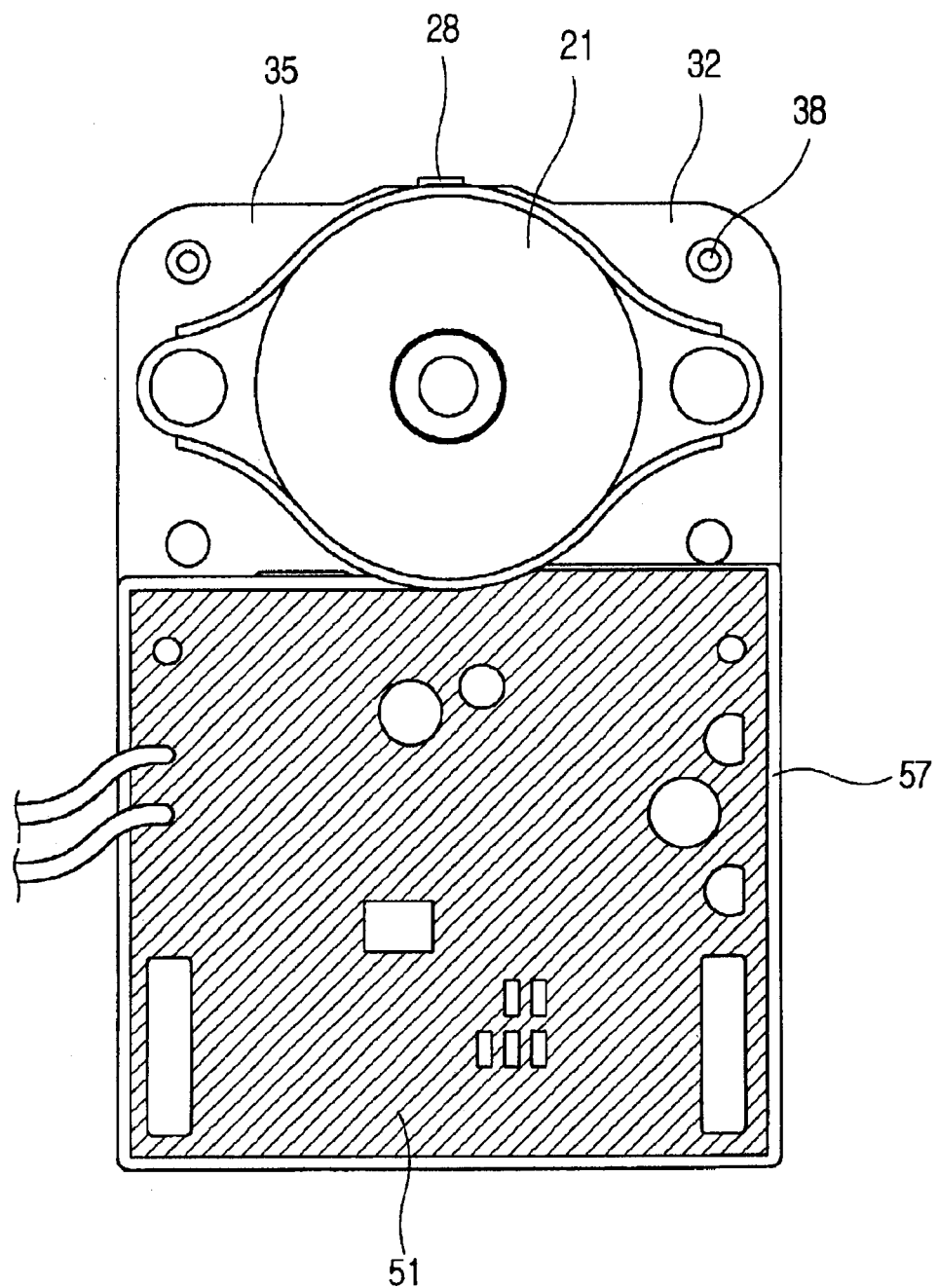
FIG. 9 is a rear elevation view showing an assembled state of the skeleton type brushless motor according to the present invention.
Figure 10:
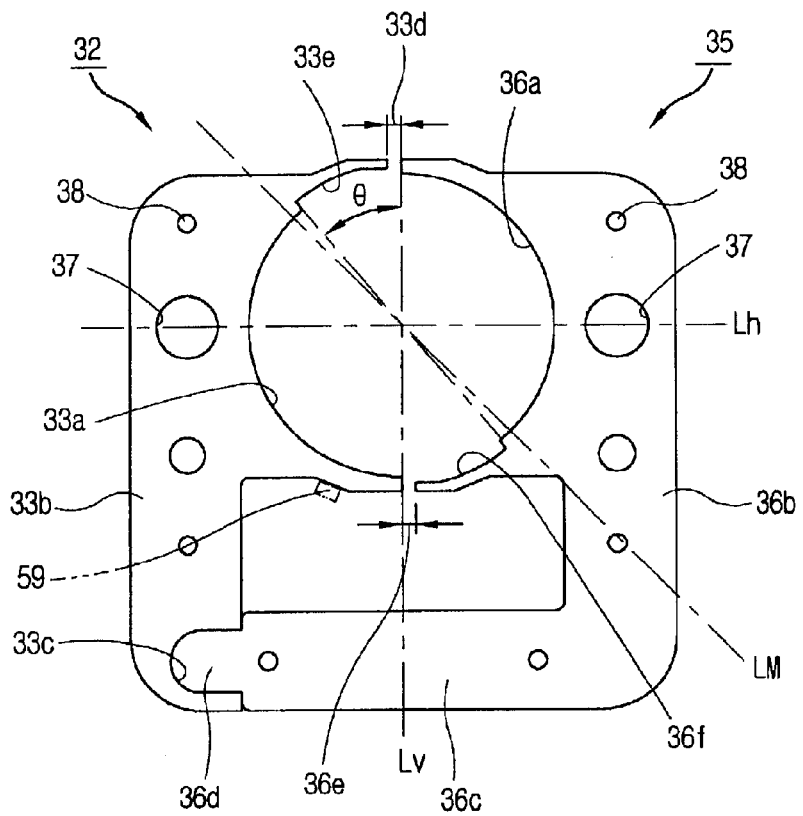
FIG. 10 is a side view showing a stator core in the skeleton type brushless motor according to the present invention.
Figure 11:
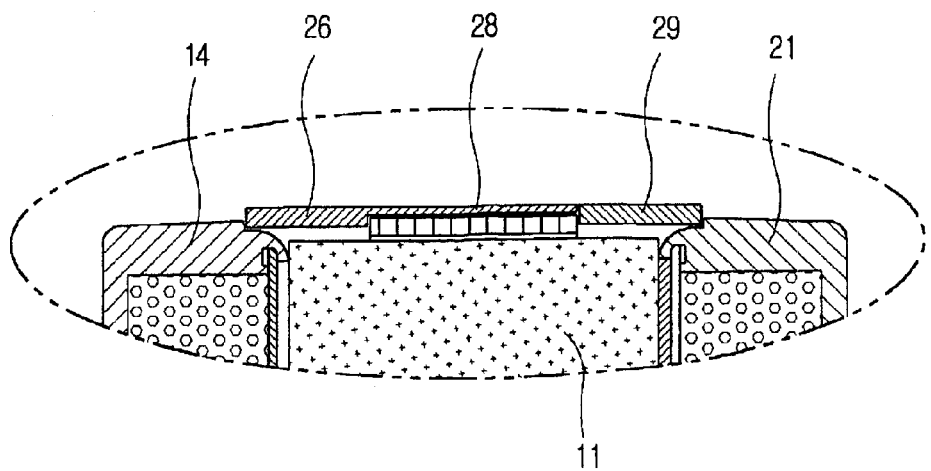
FIG. 11 is an enlarged view showing principal parts of the skeleton type brushless motor shown in FIG. 8.

FIGS. 7 and 8 are an exploded perspective view and a partially longitudinal sectional view showing a skeleton type brushless motor according to the present invention, FIG. 9 is a rear elevation view showing an assembled state of the motor according to the present invention, and FIG. 10 is a side view showing a stator core of the skeleton type brushless motor according to the present invention. In addition, FIG. 11 is an enlarged view showing principal parts of the skeleton type brushless motor shown in FIG. 8.

As shown in FIG. 7, the skeleton type brushless motor according to the present invention comprises: a rotor 11 in which a rotational shaft 13 is pressed and fixed; stators 31 which are arranged so as to face each other centering around the rotor 11 for rotating the rotor 11; a PCB (Printed Circuit Board) 51, that is, a drive control unit on which a drive control circuit (not shown) for rotating and controlling the rotor 11 is formed; and a PCB cover 57 coupled on one side of the stator 31 for receiving and supporting the PCB 51.

The rotor 11 is made using a permanent magnet of cylindrical shape, and includes the rotational shaft 13 coupled at a center part of the rotor 11 as a single body.

A pair of rotational shaft supporting units 14 and 21 including bearings 16 and 22 for rotatably supporting the rotational shaft 13 are connected on both sides of the stator 31 in a direction of the rotational shaft 13.

As shown in FIGS. 7 and 8, the shaft support parts 14 and 21 includes shaft insertion parts 14a and 21a through which the rotational shaft 13 of the rotor 11 can be inserted, and bearings 16 and 22 are received and connected to the shaft support parts 14 and 21.

A pair of screw boss parts 18 and 23 which are protruded so as to overlap a through hole 37 formed on the stator 31 are formed on boundary portion of the shaft support parts 14 and 21. A though hole 19 through which a screw 20 for combining the stator 31 with the shaft support parts 14 and 21 can be passed is formed at a center of the respective screw boss parts 18 and 23. And female screw parts 25 are formed on a boundary portion of the screw boss parts 18 and 23 in pair.

Meanwhile, as shown in FIG. 8, the rotor 11 is formed to be protruded to both directions from a plate surface of the stator 31 in a direction of rotational shaft In addition, as shown in FIGS. 7 and 8, a first separation member 26 and a second separation member 29 are respectively inserted between the shaft support parts 14 and 21 and the stator 31 so as to prevent impurities from approaching from outer circumference.

The first separation member 26 and the second separation member 29 are formed by using a nonconductor such as synthetic resins of circular ring shape so that the rotor 11 is able to rotate therein, joint parts 27 and 30 of "C" shape which are opened outwardly are formed on both end parts of the receiving parts 14 and 21 so as to be connected to the respective screw boss parts 18 and 23 of the first and second shaft support parts 14 and 21.

As shown in FIGS. 7 and 8, cover members 28, which are protruded in length direction of the rotational shaft 13 of the rotor 11 and disposed on outer side of the stator 31, are formed on the respective first separation member 26 and on the second separation member 29 so as to cover separate spaces 33d and 36e which will be described later.

Meanwhile, as shown in FIG. 10, the stator 31 comprises: a first stator core 32 and a second stator core 35 on which a first rotor receiving part 33a and a second rotor receiving part 36a facing each other centering around the rotor 11, which are disposed on outer side of the rotor 11 with an air gap, a bobbin 39 which is a coil winding unit combined with the second stator core 35, and a first coil 40a and a second coil 40b wound respectively on the bobbin 39.

The first stator core 32 comprises a first rotor receiving part 33a of semicircular shape which is disposed on boundary of the rotor 11 with the separate spaces 33d and 36e, and a first extended part 33b which is extended to one direction (downward in FIG. 10) of the rotor receiving part 33a.

The second stator core 35 comprises: a second rotor receiving part 36a of semicircular shape which is disposed on the boundary of the rotor 11 so as to face the first rotor receiving part 33a; a second extended part 36b to one direction (downward in FIG. 10) of the second rotor receiving part 36a; and a curved part 36c, which is curved so as to contact to inner circumferential part of the first extended part 33b on an end part of the second extended part 36b, and the bobbin 39 is assembled thereto.

The first and the second stator cores 32 and 35 are formed by insulating and laminating pressed steel sheets, and fixed and connected as a single body by rivet 38 which penetrates the sheets in vertical direction for the surfaces of the stator cores 32 and 35.

The through holes 37 are formed on the respective first stator core 32 and on the second stator core 35 so that the respective screw boss parts 18 and 23 of the first shaft support part 14 and the second shaft support part 21 are inserted therethrough.

A groove part 33c is formed on the first extended part 33b, and a protruded part 36d is formed on an end part of the curved part 36c so as to be received into the groove part 33c.

The first stator core 32 and the second stator core 35 are disposed to face each other with the separate spaces 33d and 36e therebetween so that the leakage flux can be restrained.

In other words, outer profiles of the first stator core 32 and the second stator core 35 near the first and the second separate spaces 33d and 36e, protrude outwardly away from the rotational shaft 13 as the outer profiles respectively progress toward each end of the first and second stator cores 32, 35.

Meanwhile, as shown in FIG. 10, the first rotor receiving part 33a and the second rotor receiving part 36a are protruded outwardly near the first and second separate spaces 33d and 36e along with the radial direction.

If the radius of the rotor 11 is enlarged in order to increase the output of the motor, the output of the motor can be increased by forming the protruded parts near the first and second separate spaces without increasing the entire stator 31.

In particular, one end of the first rotor receiving part 33a near the first separate space 33d and an opposite end of the second motor receiving part 36a near the second separate space 36e are offset from a vertical center line $L_v$ of the first and second stator cores 32, 35 and rotational shaft 13.

As shown in FIG. 10, the separate spaces are divided into a first separate space 33d formed on upper part of the first and second rotor receiving parts 33a and 36a, and a second separate space 36e formed on lower part of the first and second rotor receiving parts 33a and 36a.

Herein, the first separate space 33d and the second separate space 36e are formed to face each other centering around the rotational shaft of the rotor 11, and it is desirable that the width of the separate space is 0.3 mm through 1 mm.

In addition, a pair of detent parts 33e and 36f having larger radius than the radius from the rotational shaft 13 to the first and second rotor receiving parts 33a and 36e are formed on the first and second rotor receiving parts 33a and 36a in rotating direction of the rotor 11.

As shown in FIG. 10, the first detent part 33e and the second detent part 36f are formed respectively on the rotor receiving part 33a and on the second rotor receiving part 36a to the rotating direction of the rotor 11 around 10–20° (θ) from a center line in length direction, and make a point symmetry centering around the rotational shaft 13.

As shown in FIG. 10, the center line in vertical direction (Lv) and a magnetic pole center line of the rotor 11 (LM) make about 45° angle. Especially, the angle made by the LM and the Lv can be increased by the first and second separate spaces 33d and 36e without increasing the detent parts 33e and 36f, whereby the initial maneuverability can be improved.

Figure 12:
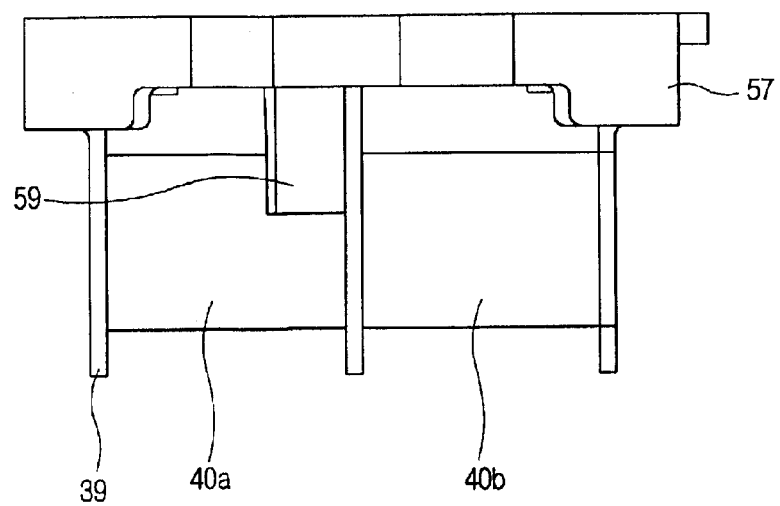
FIGS. 12 and 13 are a side view and a plan view showing a PCB cover of the skeleton type brushless motor according to the present invention.
Figure 13:
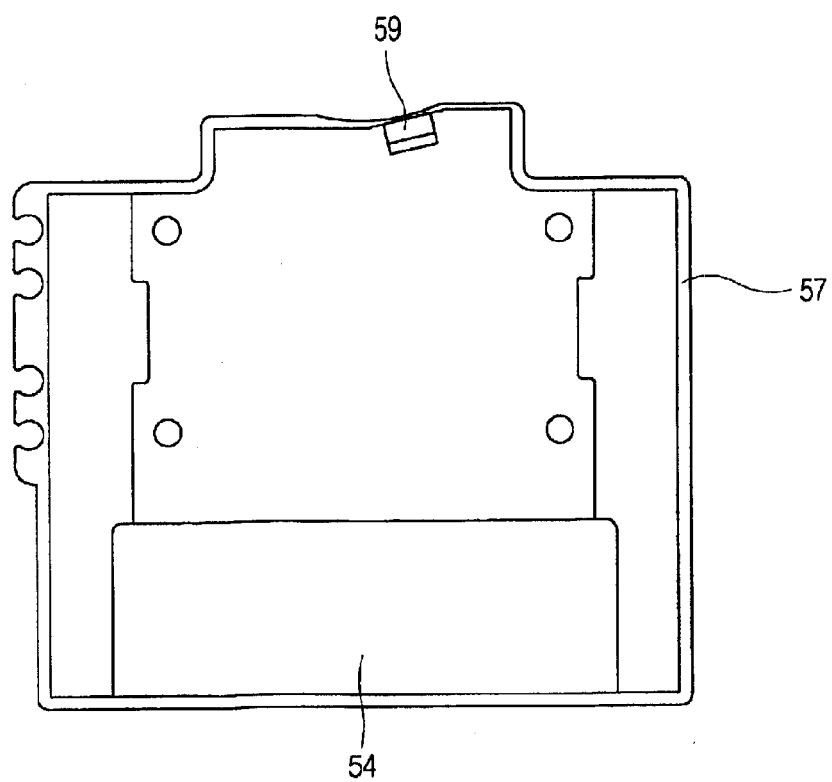
Figure 14:
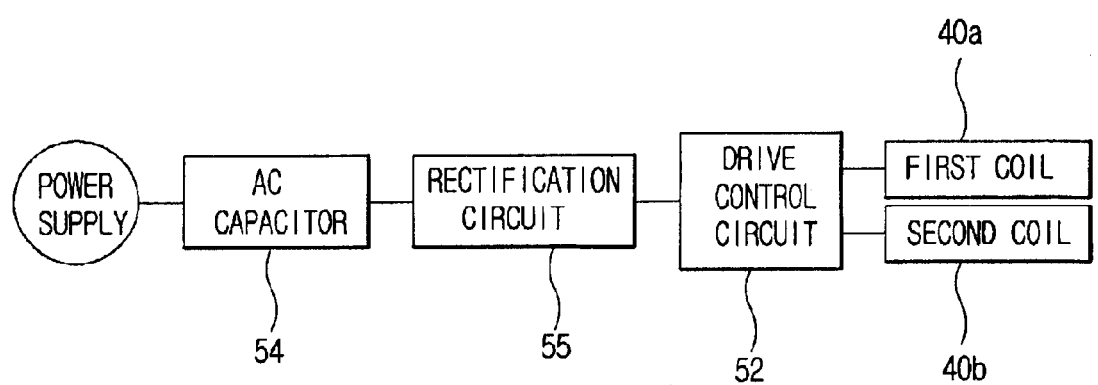
FIG. 14 is a block diagram showing circuit structure of the PCB in the skeleton type brushless motor according to the present invention.

FIGS. 12 and 13 are a side view and a plan view showing a PCB cover 57 as shown in FIG. 7, and FIG. 14 is a block diagram showing a circuit structure of the PCB shown in FIG. 7.

As shown in FIG. 12, the bobbin 39 is connected to the curved part 36c of the second stator core 35, and the first coil 40a and the second coil 40b are wound on the bobbin 39. In addition, as shown in FIGS. 12 and 13, a PCB cover 57 is coupled to one side of the bobbin 39 as a single body so as to receive and support a PCB 51 on which a drive control circuit (not shown) for rotating and controlling the rotor 11 is formed.

As shown in FIG. 13, the PCB cover 57 is coupled to one side of the bobbin 39 in length direction of the rotational shaft of the rotor 11, and the PCB 51 received on rear side of the PCB cover and sealed by silicon.

As shown in FIG. 14, the PCB 51 comprises a drive control circuit 52 for rotating and controlling the rotor 11, an AC capacitor 54 connected to a utility power for decreasing AC voltage, and a rectification circuit 55 for rectifying the AC power. In addition, a sensor receiving part 59 is formed on upper side of the PCB cover 57 so as to receive a position sensor (not shown) for detecting a rotating position of the rotor 11.

The sensor receiving part 59 is installed around 10°–20° from the Lv in an opposite rotational direction of the rotor 11 so as to sense a stimulus of the rotor 11 in advance, considering that the current which is actually applied is delayed to approach to a peak value by an inductance when the current is supplied to the coil. In the present embodiment, the sensor receiving part 59 is installed about 13.5° position from the center line Lv.

As shown in FIGS. 12 and 13, the AC capacitor 54 having one side coupled to the PCB 51 and the other side protruded in length direction of the rotational shaft 13 of the rotor 11 is connected beneath the bobbin 39 formed on front lower part of the PCB cover 57 so as to construct the motor compactly. And the AC capacitor 54 decreases voltage of the utility power supplied from outside to 1/5 through 1/10 level.

The rotor 11 is arranged so that the center line LM is rotated about 45° from the vertical center line Lv of the motor by the first and second separate spaces 33d and 36e and by the first and second detent parts 33e and 36f. The AC capacitor 54 decreases the voltage of the AC power supplied from outside, and the rectification circuit 55 rectifies the AC power decreased by the AC capacitor 54, then the rectified AC power is supplied one of the first coil 40a and the second coil 40b.

When the location of the magnetic pole of the rotor 11 is detected by the position sensor (not shown), the drive control circuit 52 provides one of the first coil 40a and the second coil 40b with the rectified AC power on the basis of the detecting result. Accordingly, the rotor 11 is rotated.

Meanwhile, the first and second separate members 26 and 29 prevent the approach of impurities from outside, and the cover member 28 formed on the first separate member 26 is disposed outer sides of the first separate space 33d and of the second separate space 36e to prevent the approaches of the impurities to the rotor 11 through the separate spaces 33d and 36e.

According to the present invention, the stator is formed so that the first rotor receiving part and the second rotor receiving part which are disposed on boundary part of the rotor are separated from each other, whereby loss of effective flux caused by the leakage flux can be prevented and the efficiency of the motor can be improved.

Also, if the output is increased, only outer portions of the stator near the separate spaces are protruded to the outer radial direction of the rotor differing from the conventional art in which the first rotor receiving part and the second rotor receiving part are formed as a single body and the length and width of the stator should be increased, thereby the motor can be constructed compact.

Also, according to the conventional art, the extended receiving part is formed as a single body with the conductive shaft support part so as to receive the protruded part of the rotor from the stator and therefore an eddy current loss is generated, however, according to the present invention, a pair of separate members which are made using an additional nonconductor such as synthetic resins are disposed, and the impurities can not approach to the rotor and the eddy current loss is restrained, thereby the efficiency of the motor can be increased.

In addition, a position sensor is disposed so as to detect the position of the rotor magnetic pole in advance, considering that the electric power which is applied to the coil is delayed, and therefore a magnetic flux is generated corresponding to the rotation of the rotor, thereby the efficiency of the rotor can be improved.

According to the conventional art, the first rotor receiving part and the second rotor receiving part are formed as a single body and then the efficiency is lowered by increasing an effective air gap in case that the detent part is enlarged, however, according to the present invention, a detent groove and separate spaces are formed to increase the maneuverability.

Meanwhile, according to the present invention, the AC capacitor for decreasing voltage of the utility power and the rectification circuit for rectifying the AC power are installed on the PCB, and therefore, the motor can be constructed without using an additional device for supplying the AC current and the motor can be driven directly using the utility power.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A skeleton type brushless motor comprising:
    a rotor having a rotational shaft in a center thereof;
    a first stator core including a first semicircular inner profile defined between first and second ends of said first stator core;
    a second stator core including a second semicircular inner profile defined between first and second ends of said second stator core, wherein said second stator core is connected to said first stator core such that said second semicircular inner profile faces to said first semicircular inner profile and a first separation space exists between said first end of said first stator core and said first end of said second stator core, and a second separation space exists between said second end of said first stator core and said second end of said second stator core;
    a coil winding unit connected to at least one of said first and second stator cores; and
    a coil wound on said coil winding unit,
    wherein outer profiles of said first stator core and the second stator core near the first separation space or the second separation space, protrude outwardly away from said rotational shaft as said outer profiles progress toward the end of the first stator core or the second stator core.

2. The motor of claim 1, wherein outer profiles of said first stator core and the second stator core near both the first separation space and the second separation space, protrude outwardly away from said rotational shaft as said outer profiles progress toward each end of the first stator core and the second stator core.

3. The motor of claim 1, further comprising:
    a first detent part formed in said first semicircular inner profile adjacent to said first end of said first stator core, said first detent part being characterized by a displacement of said inner profile outwardly away from said rotational shaft.

4. The motor of claim 3, further comprising:
    a second detent part formed in said second semicircular inner profile adjacent to said second end of said second stator core, said second detent part being characterized by a displacement of said inner profile outwardly away from said rotational shaft.

5. The motor of claim 4, wherein said first and second detent parts are symmetrically arranged around a centerline of said rotational shaft.

6. The motor of claim 1, wherein said first and second separation spaces are symmetrically arranged around a centerline of said rotational shaft.

7. The motor of claim 1, wherein said first stator core is electrically separated from said second stator core at said first separation space and said second separation space.

8. The motor of claim 7, wherein said first stator core is electrically connected to said second stator core at a point remote from said first and second separation spaces.

9. The motor of claim 1, wherein said rotor includes a permanent magnet encircling said shaft.

10. The motor of claim 1, wherein a distance of said first separation space is equal to a distance of said second separation space.

11. The motor of claim 1, wherein a distance of said first separation space is approximately 0.3 to 1 mm.

12. The motor of claim 1, wherein a distance of said second separation space is approximately 0.3 to 1 mm.

13. The motor of claim 1, further comprising:
a sensor for sensing a rotational position of said rotor, wherein said sensor is located approximately 10 to 20 degrees from one of said first and second separation spaces and upstream from said one of said first and second separation spaces, relative to a rotational direction of said rotor.

14. The motor of claim 1, further comprising:
a first shaft support part supporting one end of said rotational shaft;
a first nonconductive separation member located between said first shaft support part and said first and second stator cores for receiving a part of the rotor protruded from the stator cores;
a second shaft support part supporting another end of said rotational shaft; and
a second nonconductive separation member located between said second shaft support part and said first and second stator cores for receiving a part of the rotor protruded from the stator cores.

15. The motor of claim 14, further comprising:
a first cover extending from said first separation member toward said first and second stator cores and covering said first separation space; and
a second cover extending from said second separation member toward said first and second stator cores and covering said second separation space.

16. The motor of claim 1, further comprising:
a drive control unit connected to said coil winding, wherein said drive control unit includes an AC capacitor for connection to utility power for decreasing a voltage of the utility power, and a rectification circuit for rectifying the utility power.

17. A skeleton type brushless motor comprising:
a rotor having a rotational shaft in a center thereof;
a first stator core having a first rotor receiving part formed therein for receiving the rotor;
a second stator core having a second rotor receiving part formed therein for receiving the rotor;
first and second gaps formed between the first and second stator cores, respectively;
a coil winding unit connected to the first and second stator cores;
a coil wound on the coil winding unit;
a pair of shaft support parts rotatably supporting the rotational shaft on both sides of the stator cores; and
a pair of nonconductive separation members, said separation members being inserted between and contacting the stator cores and respective ones of the shaft support parts and receiving a part of the rotor protruded from the stator cores.

18. The motor of claim 17, wherein a cover is formed on one of the separation members for covering the first and second gaps.

19. The motor of claim 17, wherein said first and second stator cores are symmetric with respect to an imaginary symmetry line passing through the rotational shaft, and a sensor for sensing a rotational position of the rotor is positioned around 10–20° from the symmetry line, nearer to the coil winding unit in a direction opposite to a rotational direction of the rotor.

20. The motor of claim 17, further comprising:
a PCB formed with a drive control circuit, and connected to the coil winding unit.

21. The motor of claim 20, wherein the PCB includes an AC capacitor for being connected to utility power, and a rectification circuit for rectifying the utility power.

22. The motor of claim 20, further comprising: a PCB cover, connected with the PCB in a length direction of the rotational shaft for covering the PCB, wherein a sensor receiving part, for receiving the sensor, is formed in the PCB cover.

23. The motor of claim 17, wherein a pair of detent parts, having a larger radius from the rotational shaft than radii of the first and second rotor receiving parts, are formed around one end of each of the first and second rotor receiving parts in a rotational direction of the rotational shaft, and are point symmetric centering on the rotational shaft.

* * * * *